United States Patent [19]

Sargeant

[11] 4,095,483

[45] Jun. 20, 1978

[54] EXTERIOR REAR VIEW MIRROR FOR VEHICLES

[75] Inventor: Archibald Sargeant, Felpham, England

[73] Assignee: Wingard Limited, Sussex, England

[21] Appl. No.: 650,358

[22] Filed: Jan. 19, 1976

[30] Foreign Application Priority Data

Jan. 19, 1975 United Kingdom ............... 2242/75

[51] Int. Cl.² .......................... F16C 1/10; A47G 1/24; G02B 5/08; G02B 5/10
[52] U.S. Cl. .............................. 74/501 M; 248/480; 248/485; 350/307
[58] Field of Search ................... 74/501 M; 240/61.4, 240/61.6, 61.7, 61.8, 61.13; 248/479, 480, 481, 482, 484, 485, 486, 487; 350/303, 304, 305, 307

[56] References Cited

U.S. PATENT DOCUMENTS

| 1,775,436 | 9/1930 | Miller | 240/61.13 |
| 2,919,599 | 1/1960 | Milton et al. | 74/501 M |
| 3,000,263 | 9/1961 | Milton et al. | 240/61.6 X |
| 3,170,334 | 2/1965 | Shrode | 74/501 M |
| 3,352,524 | 11/1967 | Rossi | 74/501 M |
| 3,554,049 | 1/1971 | Holmes | 74/501 M |
| 3,934,489 | 1/1976 | Bottrill | 74/501 M |

Primary Examiner—Benjamin W. Wyche
Assistant Examiner—Don E. Ferrell
Attorney, Agent, or Firm—Scrivener, Parker, Scrivener and Clarke

[57] ABSTRACT

A rear view mirror for a motor vehicle in which a mirror head is mounted for angular movement about two axes at right angles to each other and is adjustable about these axes by rotation of a single control shaft. Adjustment of the head about one axis is effected by rotation of an eccentric element by the shaft, and adjustment about the other axis is effected by linear movement produced by rotation of a second element such as a scroll cam or screw thread. A lost motion device is arranged between the shaft and at least one of the elements so that a degree of adjustment of the mirror head about one axis can be effected without alteration to the angular setting of the head with respect to the other axis. The lost motion device may be arranged between the two elements or between an additional fine-adjust device and both the elements.

11 Claims, 3 Drawing Figures

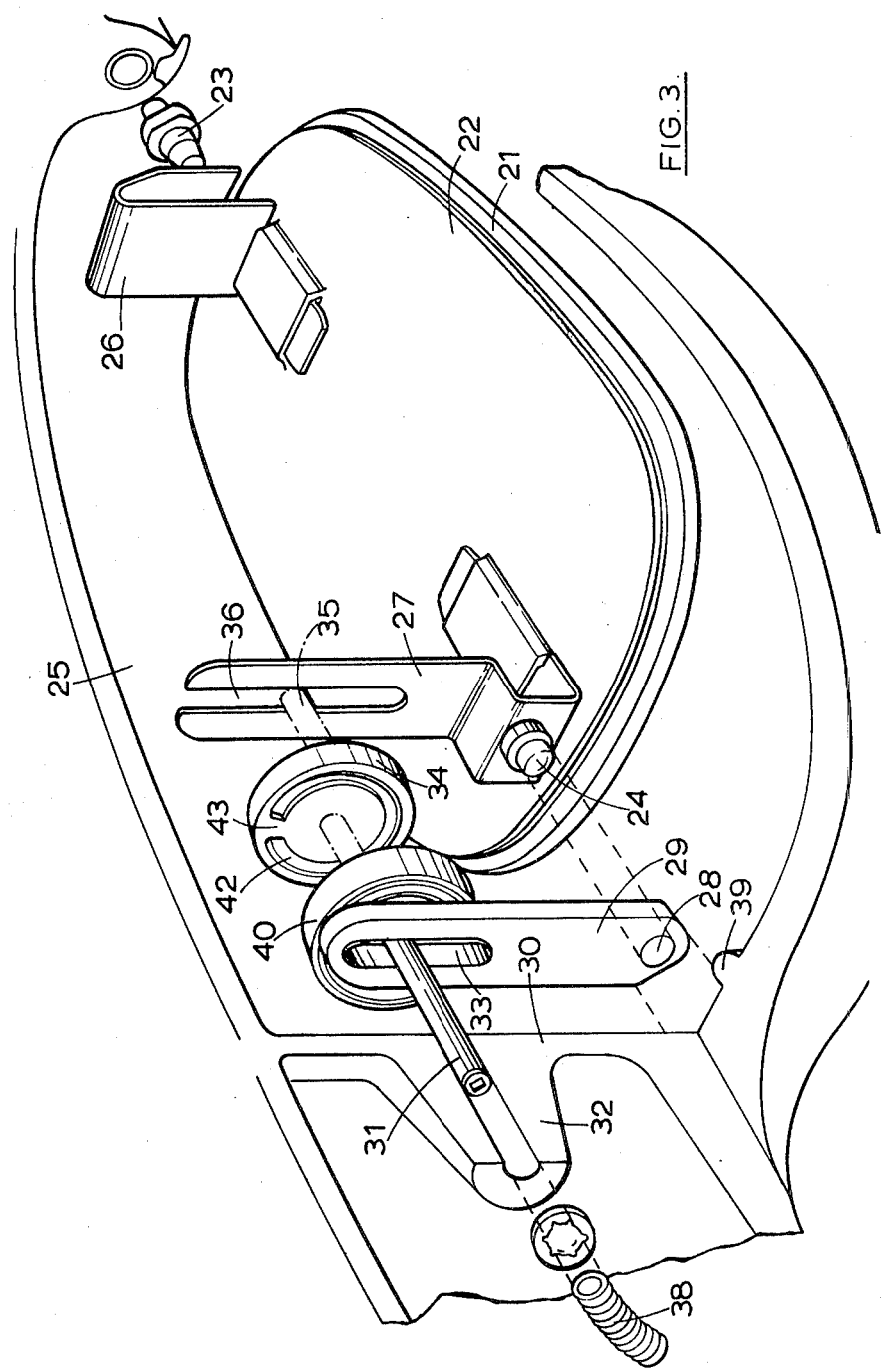

EXTERIOR REAR VIEW MIRROR FOR VEHICLES

This invention relates to the remote control of exterior rear view mirrors for vehicles.

It has been proposed to control the angular position of such a mirror in two planes remotely from inside the vehicle by the use of a joy-stick and three flexible cables. However this is complicated and involves a large hole in the skin of the vehicle where the cables pass through, and an improved remote control arrangement involving only a single flexible cable has been proposed. Rotation of the cable causes rotation of an eccentric which is engaged by a fork connected to the mirror, and one complete rotation of the eccentric tilts the mirror through a full cycle about one axis, for example a horizontal axis parallel to its plane. The cable also acts on a screw threaded member that rotates about an axis parallel to this first axis of tilting, so that each complete rotation of the cable advances the screw-threaded member along the axis a distance equal to one pitch of the thread. This member is coupled through a fork to the mirror to tilt it about, for example, a vertical axis. In a preferred arrangement both forks are combined in a gimbal structure mounted directly on the back of the mirror and carrying a gimbal-mounted nut which engages directly a screw thread formed on the eccentric. This is shown in the specification of our U.S. patent application Ser. No. 460,102, now U.S. Pat. No. 3,934,489.

To adjust the mirror in two planes, the user first turns a knob (connected to the free end of the cable) through a number of turns to set the angular position about a vertical axis and then turns it through an appropriate fraction of a turn backwards or forwards to set the required tilt about a horizontal axis. This is satisfactory as far as it goes, but the adjustment about one axis is not infinite, being only in a series of steps determined by the pitch of the thread. The choice of pitch is necessarily a compromise between a fine thread which gives more accurate adjustment and a coarse thread which gives quicker adjustment.

The aim of the present invention is to overcome this drawback and to allow substantially continuous adjustment in both planes but still only using one motion, namely rotation of a shaft or cable.

According to the present invention we provide a rear view mirror for a motor vehicle in which a mirror head is mounted for angular movement about two axes at right angles to each other and is adjustable about these axes by roration of a single control member, adjustment of the head about one axis being effected by rotation of an eccentric element by the control member, and adjustment about the other axis being effected by means for producing linear motion from rotation of the control member, a lost motion device being provided so that a degree of adjustment of the mirror head about one axis can be effected without substantial alteration to the angular setting of the head with respect to the other axis.

The lost motion device may be arranged between the eccentric element and the means for producing linear motion whereby one adjustment can be made first by rotating the control member in one direction and the other adjustment made or corrected subsequently by rotating the control member in the opposite direction, the lost motion device preventing any change in the first adjustment. Alternatively the lost motion device may be arranged between an additional adjustment element connected directly to the control member and the eccentric element and means for producing linear motion whereby one adjustment is made by rotating the control member several turns in one direction and the second adjustment by a further part turn, the slight change in the first adjustment being corrected by a part turn in the reverse direction to operate the additional adjustment means, the lost motion device preventing the adjustment of the eccentric element and means for producing linear motion from being altered.

The means for producing linear motion may be a screw thread or it may be a scroll cam.

Some embodiments of the invention will now be described by way of example only, with reference to and as shown in the accompanying drawings, in which:

FIG. 3 is an exploded perspective view of the component parts of the mirror shown in FIG. 2.

Figure 1:
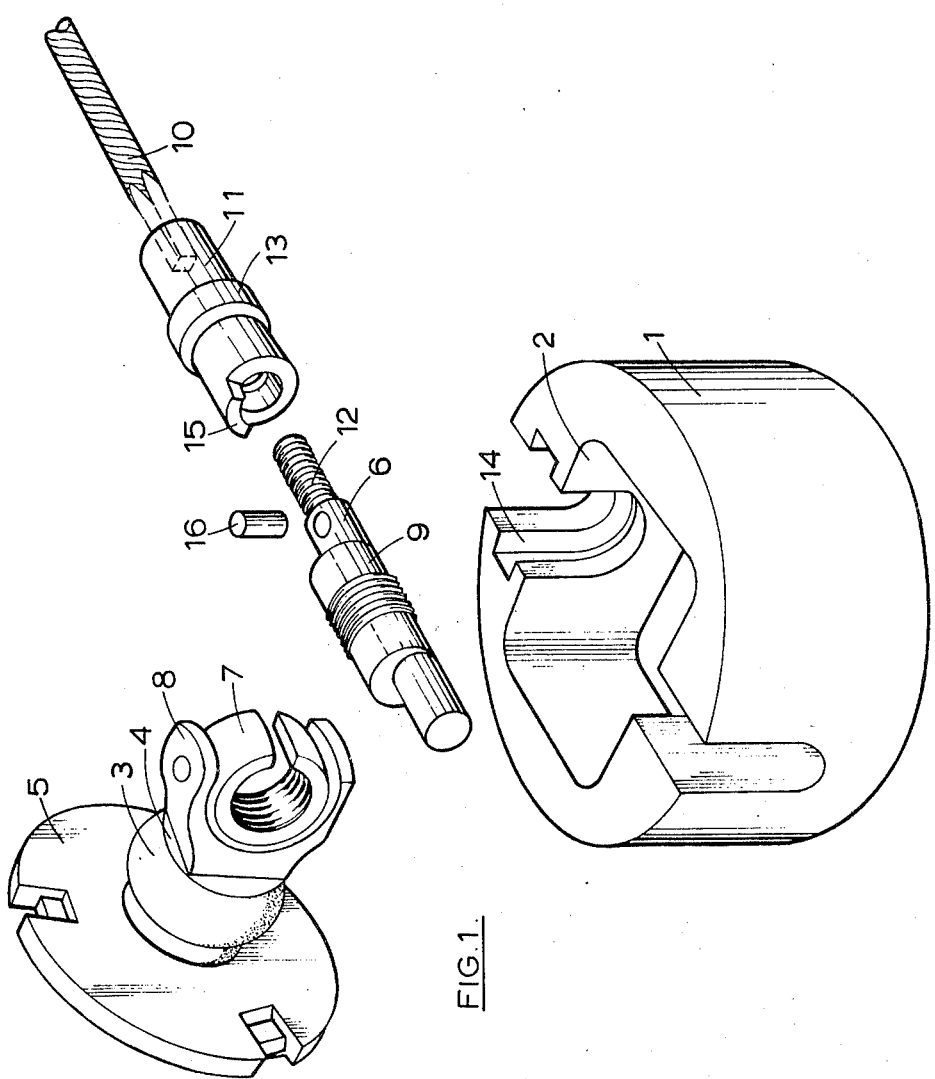
FIG. 1 is an exploded view of the principal parts of a mirror assembly embodying the invention.

The assembly shown in FIG. 1 comprises a mounting block 1 in which a recess 2 is formed. The recess 2 receives a part-spherical boss 3 provided on a stem 4 extending from one face, the rear face, of a mirror mounting plate 5 which carried a mirror head (not shown). Although the recess 2 shown is of generally square cross-section its dimensions correspond to the diameter of the boss 3 so that the boss contacts the four faces of the square recess and is thus located for rocking movement in the block 1 in the manner of a ball and socket joint. The mirror head is held in the block 1 by a spindle 6 extending through the block and across the recess 2 where it passes through a ring 7 pivotally mounted in a yoke 8 on the end of the stem 4, the pivot axis of the ring being normal to the axis of the spindle 6. The portion 9 of the spindle 6 passing through the ring is eccentric and has a screw thread formed on it which engages a corresponding thread formed on the inner face of the ring 7.

It will be appreciated that when the spindle 6 is rotated the eccentric portion 9 rocks the mirror head to and fro about a first axis passing through the boss 3 parallel to the spindle, performing a complete cycle to opposite sides of a mean central position for each complete revolution of the spindle. At the same time each revolution displaces the ring 7 along the threaded eccentric portion 9 through a distance equal to the pitch of the thread thereby tilting the mirror head about a second axis passing through the boss 3 perpendicular to the axis of the spindle.

The spindle 6 is driven by a flexible shaft 10 through a coupling member 11 which is screwed onto a threaded portion 12 at one end of the spindle. The coupling 11 is provided with a thrust collar 13 which engages in a corresponding groove 14 in a journal formed in the block 1. The spindle 6 has no thrust bearings and is free to float being axially restrained only by its threaded connection with the coupling member 11. Drive is transferred from the coupling member 11 to the spindle 6 by way of a lost motion device comprising a lug 15 on the coupling member arranged to engage a pin 16 set in a radial hole in the spiindle. When the flexible shaft 10 is rotated in one direction the lug 15 moves into contact with the pin 16 and rotates the spindle 6 causing the mirror head to move as described above. On reversing the direction of rotation of the flexible shaft 10 initially no rotation is transmitted to the spindle as the lug 15 moves round the spindle from one side of the pin 16 to the other. However due to the threaded connection between the coupling member 11 and the spindle 6 the spindle will move axially.

Thus the user first adjusts the mirror in azimuth, i.e., about the second axis, which is usually substantially vertical, by several turns of the flexible shaft 10 which may be connected to a knob inside a vehicle to which the mirror is fitted. Continuing to rotate the shaft in the same direction the exact angular position to give the desired tilt with respect to the horizontal is set. However this last adjustment alters the azimuth setting slightly but this is then regained by rotating the knob in the opposition direction, the lost motion device then acting to allow correction of aximuth setting without altering the tilt setting.

The pitch of the screw thread 12 connecting the coupling member 11 to the spindle 6 may be equal to or slightly greater than the pitch of the screw thread on the eccentric portion 9 of the spindle.

Figure 2:
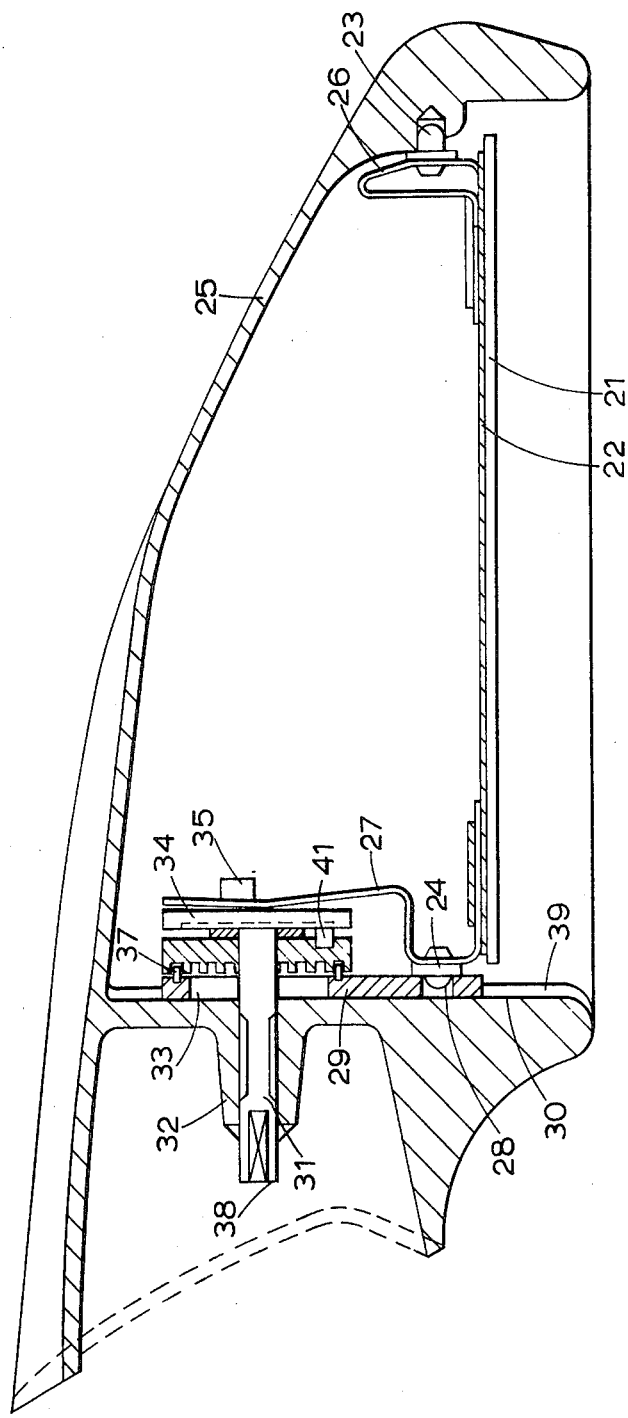
FIG. 2 is a longitudinal section of another form of mirror.

In the arrangement shown in FIGS. 2 and 3 a mirror glass 21 is carried by a backing plate 22 mounted in a housing 25 to rock about an axis formed by pivot pins 23 and 24. The pin 23 is freely mounted in a recess in one end of the housing 25 and its rounded free end is received in a hole in a resilient folded metal strip 26 secured to the rear face of the backing plate 22. The other pin 24 is fixed in a strip 27 also secured to the rear face of the backing plate but having a portion extending away from the backing plate 22 substantially at right angles thereto. The outer end of the pin 24 is received in a hole 28 in a cam follower bar 29 which extends substantially at right angles to the mirror glass 21 and is in sliding engagement with a wall 30 in the housing, the bar being located between two ribs 39 formed on the wall.

A spindle 31, of which the axis is normal to the wall 30, is rotatably mounted in a boss 32 on the outer side of the wall and passes through a slot 33 in the bar 29. A disc 34 is fixed to the inner end of the spindle 31 and has an eccentric peg 35 on its innermost face. The peg 35 is received in a slot 36 in the strip 27. A grooved scroll cam 40 is carried on the spindle 31 between the bar 29 and the disc 34. The cam 40 is freely rotatable on the spindle with the cam groove facing the bar 29 and engaging projections 37 on the bar. The cam 40 is connected to the disc by a lost motion device comprising a pin 41 projecting from one face of the cam and engaging with an annular groove 42 in the adjacent face of the disc 34, a short break 43 in the groove forming a stop for the pin.

The spindle is adapted to be rotated by a flexible shaft 38 from any convenient point, and as the spindle is rotated first the lost motion between the disc 34 and cam 40 is taken up and then the scroll cam progressively moves the bar 29 in a direction substantially at right angles to the mirror. As the bar moves, the pivot pin 24 moves to adjust the mirror about one axis, the resilient mounting of the pin 23 allowing for this movement. Also on each turn of the shaft 38 the engagement of the peg 35 in the slot 36 rocks the mirror about the axis formed by the pivot pins 23 and 24. Adjustment about this axis can be set by reversing the direction of rotation of the shaft after first setting the cam, the lost motion device ensuring that the first adjustment is not altered by the later adjustment.

I claim:

1. A rear view mirror for a motor vehicle comprising a mirror head mounted for angular movement about a first axis and about a second axis at right angles to said first axis, a single rotatable control member for adjusting the angular positions of said mirror solely by rotation of said control member and without axial movement thereof, first mirror-tilting means comprising an eccentric element connected for rotation by the control member and operative on rotation to adjust the angular setting of said mirror head about said first axis, second mirror-tilting means comprising means operative to produce linear motion from rotation of said control member and to adjust the angular setting of said mirror head about said second axis, and a limited lost motion device between said control member and one of said first and second mirror-tilting means constructed and arranged that a degree of adjustment of said mirror head about one of said axes can be effected solely by a limited degree of rotation of said control member without upsetting the angular setting of said head with respect to the other of said axes.

2. A rear view mirror in accordance with claim 1, wherein said second mirror-tilting means comprises a first screw thread.

3. A rear view mirror in accordance with claim 1, including an additional adjustment element connected directly to said control member, said lost motion device being located between said additional adjustment element and said eccentric element and said second mirror-tilting means.

4. A rear view mirror in accordance with claim 3, wherein said additional adjustment element comprises a second screw thread.

5. A rear view mirror in accordance with claim 3, wherein said eccentric element is an eccentric portion of a shaft and said second mirror-tilting means comprising a first screw thread formed on said eccentric element, and including a member pivotally connected to said mirror head and engaging said first screw thread.

6. A rear view mirror in accordance with claim 5 including a housing and a ball and socket joint mounting said mirror head in said housing for angular movement about said axes.

7. A rear view mirror in accordance with claim 1 wherein said lost motion device is located between said eccentric element and said second mirror-tilting means.

8. A rear view mirror in accordance with claim 7 wherein said second mirror-tilting means is a scroll cam and including a disc mounted adjacent said scroll cam, and wherein said eccentric element comprises an eccentric peg projecting from said disc, and said lost motion device is located between said cam and said disc whereby rotational drive is transferred between said cam and said disc.

9. A rear view mirror in accordance with claim 8, wherein said disc is connected directly to said control member and said cam is driven through said lost motion device.

10. A rear view mirror in accordance with claim 8 including a first pivot pin and a second pivot pin, said mirror head being mounted for angular movement about said pivot pins, a cam follower co-operating with said scroll cam and carrying said first pivot pin, and an arm fitted to said mirror head and engaging said eccentric peg.

11. A rear view mirror in accordance with claim 1 wherein said second mirror-tilting means is a scroll cam.

* * * * *